UNITED STATES PATENT OFFICE.

JOSEPH EDERER, OF WILDAU, KREIS TELTOW, GERMANY, ASSIGNOR TO HOLZVER-KOHLUNGS-INDUSTRIE, AKTIENGESELLSCHAFT, OF CONSTANCE, GERMANY, A CORPORATION OF GERMANY.

PROCESS FOR PRODUCING SALTS OF FATTY ACIDS.

1,178,223.  Specification of Letters Patent.  Patented Apr. 4, 1916.

No Drawing.  Application filed April 6, 1914. Serial No. 829,860.

*To all whom it may concern:*

Be it known that I, JOSEPH EDERER, a subject of the Emperor of Germany, and a resident of the city of Wildau, Kreis Teltow, Germany, have invented certain new and useful Improvements in Processes for Producing Salts of Fatty Acids, of which the following is a specification.

The invention relates to the extraction of fatty acids in the form of their salts from vegetable raw material, such as saw-dust, waste wood, wood-pulp, straw, hay, bark, leaves and other similar material.

The invention is based on the observation that certain compounds, such as are supposed to be for instance in wood, and containing formyl, acetyl, propionyl and butyryl groups are split off by treating said raw material at temperatures below 100° C. for instance atmospheric temperature and pressure with an aqueous solution of a base, such as a solution of ammonia, dilute alkalis such as solutions of potassium hydroxid, sodium hydroxid or soda, or solutions of alkaline earth metal hydroxids, such as calcium hydroxid, the salts of the respective acids with the base reacted therewith being formed by this treatment. This splitting off is effected even by an extremely dilute solution, such as a solution of alkali hydroxid in the proportions of 1 part of alkali hydroxid to 2000 parts of water. It was further observed that in this treatment the wood does not undergo any visible change, excepting that it becomes a little darker in color.

I am aware that processes have already been patented for obtaining fatty acids or their salts by treating wood with alkaline solutions, such as is described in German Patents Nos. 69,786 and 244,816, but there is a great difference between these prior processes and my process inasmuch as, by these older processes the wood is treated with a solution of sodium hydroxid at temperatures above 100° C. and at high pressures corresponding to the high temperature, whereby a great part of the wood is destroyed and transformed into compounds soluble in the alkaline lye. Contrary to the expectations given by the processes referred to, my process works at temperatures below 100° C. and at normal pressures, for instance at atmospheric temperature and pressure, although a pressure generated by compressed air is sometimes of value, with the effect that the wood in my process is not split into cellulose and ligneous substances, the acids being obtained as stated above without noticeably affecting the wood.

In further explanation of my process, I shall describe by way of example one method of carrying out the same in which calcium hydroxid is used as one of the many agents suitable for the practice of my process. In said example I proceed as follows: The wood to be treated, for example pine wood, is reduced to small chips and is then treated in a suitable vessel with an alkaline solution comprising a dilute solution of calcium hydroxid, hereinafter referred to simply as "liquor", at atmospheric temperature. If it is desired to accelerate the extraction, the charge is moderately heated, say to not much above 50° C.; the charge is allowed to stand under atmospheric pressure for a number of hours, for example half a day. The liquor during this time gradually becomes neutral and when it has become neutral it is separated from the wood by filtration, whereupon the liquor is again enriched with calcium hydroxid solution and permitted to enter a container filled with fresh wood chips. This operation may be repeated, if desired, as many times as is necessary to cause the saturation of the liquor with salts of the fatty acids at the prevailing atmospheric temperature.

In order to perfectly extract the wood as well as to obtain a liquor of the highest possible concentration, I prefer to use a diffusion battery as one of the many suitable apparatus available for use in carrying out the operations of my process. The diffusion battery being a well known type of apparatus from its use in connection with the manufacture of beet-sugar, it is not necessary to describe the same in detail as the manipulations hereinafter referred to in connection therewith will be readily understood by anyone skilled in this branch of chemical engineering. The cells of the battery, arranged to be operated according to the counter current principle, are filled with wood chips and a quantity of lime, corresponding to the yield of acids expected, is either added directly thereto or the liquor is saturated with calcium hydroxid in its passage from one to the other of the single cells of the battery. In case lime is used the heat of reaction may be taken advantage of in accelerating the reaction as described. The battery is put into operation by passing water or a weak alkaline liquor, respectively, through the same and according to the counter current principle the weakest liquor is permitted to act upon the most exhausted wood chips. As soon as a cell is exhausted its content is discharged and another charge of fresh wood is introduced, the cell being again connected up in the battery. The more or less saturated liquor obtained at the end of the battery is evaporated and the residue consisting of the desired salt or salts or mixtures of them may be worked up by any of the well known methods to obtain the corresponding fatty acids.

The yield of fatty acids which may be obtained by the practice of my new process necessarily varies considerably, depending of course both on the material used and on the conditions of the material *per se*. In my experiments I have usually obtained from air-dried pine wood from 1 to 2% and from air-dried beech wood from 5 to 6% of fatty acids.

Where I use the term "base" in the specification and in the claims, I intend to include any aqueous solution of a compound forming salts soluble in water with the acids found in wood and the other vegetable raw material referred to, such bases being primarily ammonia, alkali metal hydroxids and alkaline earth metal hydroxids.

It is obvious that the steps of the process and the temperatures and pressures referred to may vary considerably without departing from the spirit of my invention, and I do not restrict myself to any particular temperature or pressure, raw material or substance to be reacted therewith, further than the scope of the appended claims demands.

What I claim and desire to secure by Letters Patent is:

1. The process of extracting fatty acids from vegetable raw material in the form of their salts consisting in treating said material at atmospheric temperature with an aqueous solution of a base, whereby the acids contained in said raw material are reacted with said base to form salts soluble in water, and separating the solution from the exhausted raw material.

2. The process of extracting fatty acids from vegetable raw material in the form of their salts consisting in treating said material at atmospheric pressure and at temperatures below 100° C. with an aqueous solution of a base, whereby the acids contained in said raw material are reacted with said base to form salts soluble in water, and separating the solution from the exhausted raw material.

3. The process of extracting fatty acids from vegetable raw material in the form of their salts consisting in treating said material at atmospheric temperature and pressure with an aqueous solution of a base, whereby the acids contained in said raw material are reacted upon by said base to form salts soluble in water, and separating the solution from the exhausted raw material.

4. The process of extracting fatty acids from vegetable raw material in the form of their salts consisting in treating said material at atmospheric temperature with an aqueous solution of calcium hydroxid, whereby the acids contained in said raw material are converted by said base to calcium salts soluble in water, and separating the solution of the calcium salts from the exhausted raw material.

5. The process of extracting fatty acids from vegetable raw material in the form of their salts consisting in treating said material at atmospheric pressure and at temperatures below 100° C. with an aqueous solution of calcium hydroxid, whereby the acids contained in said raw material are converted by said base to calcium salts soluble in water, and separating the solution of the calcium salts from the exhausted raw material.

6. The process of extracting fatty acids from vegetable raw material in the form of their salts consisting in treating said material at atmospheric temperature and pressure with an aqueous solution of calcium hydroxid, whereby the acids contained in said raw material are converted by said base to calcium salts soluble in water, and separating the solution of the calcium salt from the exhausted raw material.

In testimony whereof I have signed this specification in the presence of subscribing witnesses.

JOSEPH EDERER.

Witnesses:
　LONGARD SNEZER,
　WOLDEMAR HAUPT,
　W. TAULZE.